(12) United States Patent
Yonemoto et al.

(10) Patent No.: US 8,165,202 B1
(45) Date of Patent: Apr. 24, 2012

(54) VIDEO COMPRESSION RATE

(75) Inventors: Akihiro Yonemoto, Tokyo (JP); Masato Shima, Tsukuba (JP)

(73) Assignee: Texas Instruments Incorporated, Dallas, TX (US)

( * ) Notice: Subject to any disclaimer, the term of this patent is extended or adjusted under 35 U.S.C. 154(b) by 1384 days.

(21) Appl. No.: 11/694,399

(22) Filed: Mar. 30, 2007

Related U.S. Application Data (60) Provisional application No. 60/744,064, filed on Mar. 31, 2006.

(51) Int. Cl.
*H04N 11/02* (2006.01)

(52) U.S. Cl. .................................................. 375/240.03

(58) Field of Classification Search .................. None
See application file for complete search history.

(56) References Cited

U.S. PATENT DOCUMENTS

| | | | |
|---|---|---|---|
| 7,092,441 B1* | 8/2006 | Hui et al. | 375/240.03 |
| 2005/0169369 A1* | 8/2005 | Lee | 375/240.03 |
| 2006/0140267 A1* | 6/2006 | He et al. | 375/240.03 |
| 2007/0025441 A1* | 2/2007 | Ugur et al. | 375/240.03 |
| 2008/0063052 A1* | 3/2008 | Lin | 375/240.03 |

\* cited by examiner

*Primary Examiner* — David Pearson (74) *Attorney, Agent, or Firm* — Mirna Abyad; Wade J. Brady, III; Frederick J. Telecky, Jr.

(57) ABSTRACT

The video encoding rate control with the quantization parameter for basic units of macroblocks of a picture adapting to deviation from the average quantization parameter over pictures of the same type (i.e., I-pictures, P-pictures, and B-pictures).

6 Claims, 8 Drawing Sheets

VIDEO COMPRESSION RATE

CROSS-REFERENCE TO RELATED APPLICATIONS

This application claims priority from provisional patent application No. 60/744,064, filed Mar. 31, 2006. The following co-assigned copending patent applications disclose related subject matter: Ser. No. 11/218,407, filed Sep. 1, 2005.

BACKGROUND

The present invention relates to digital video signal processing, and more particularly to devices and methods for video coding.

There are multiple applications for digital video communication and storage, and multiple international standards for video coding have been and are continuing to be developed. Low bit rate communications, such as, video telephony and conferencing, led to the H.261 standard with bit rates as multiples of 64 kbps, and the MPEG-1 standard provides picture quality comparable to that of VHS videotape. Subsequently, H.263, MPEG-2, and MPEG-4 standards have been promulgated.

Figure 2A:
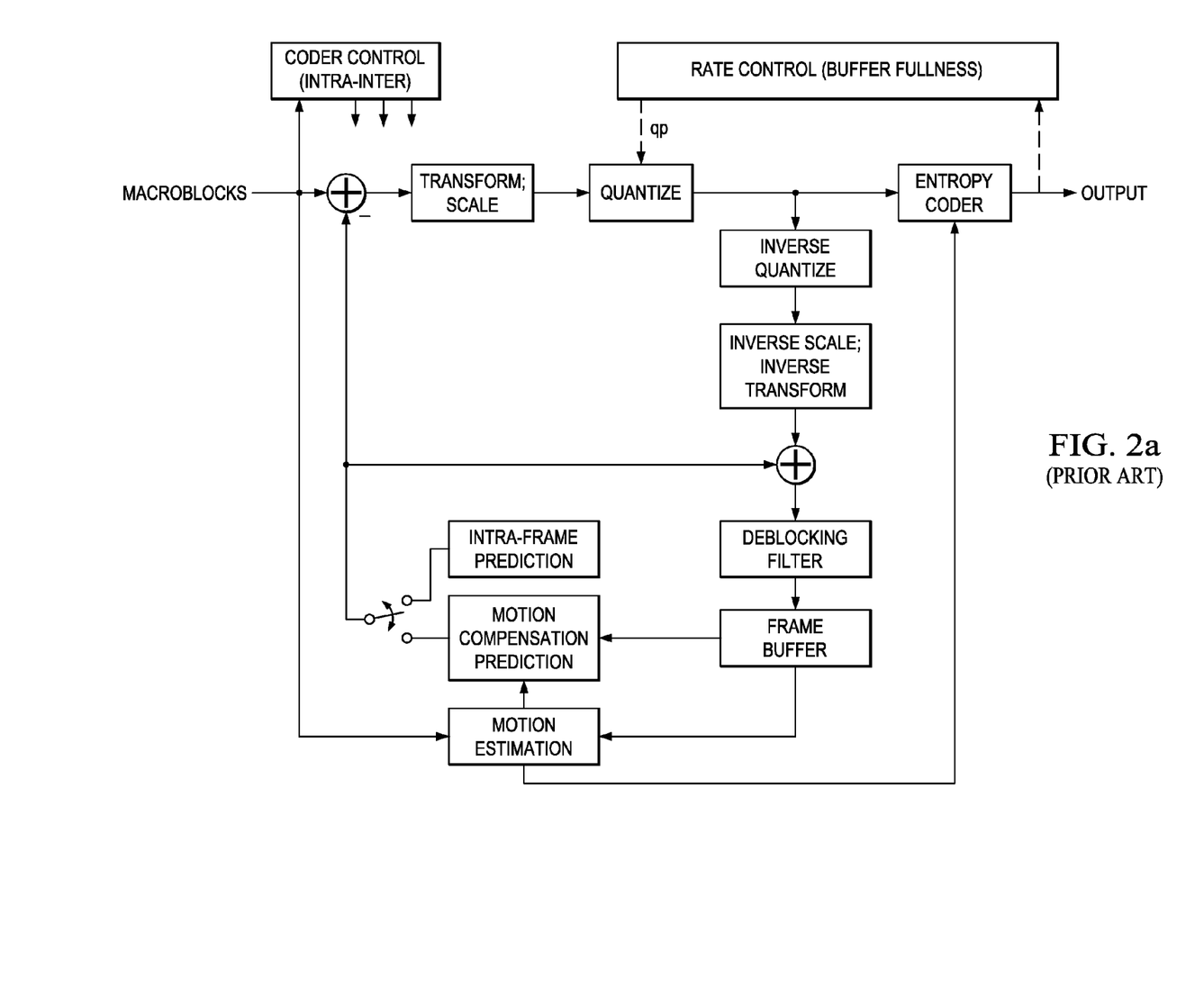
FIGS. 2a-2c show video coding functional blocks.
Figure 2B:
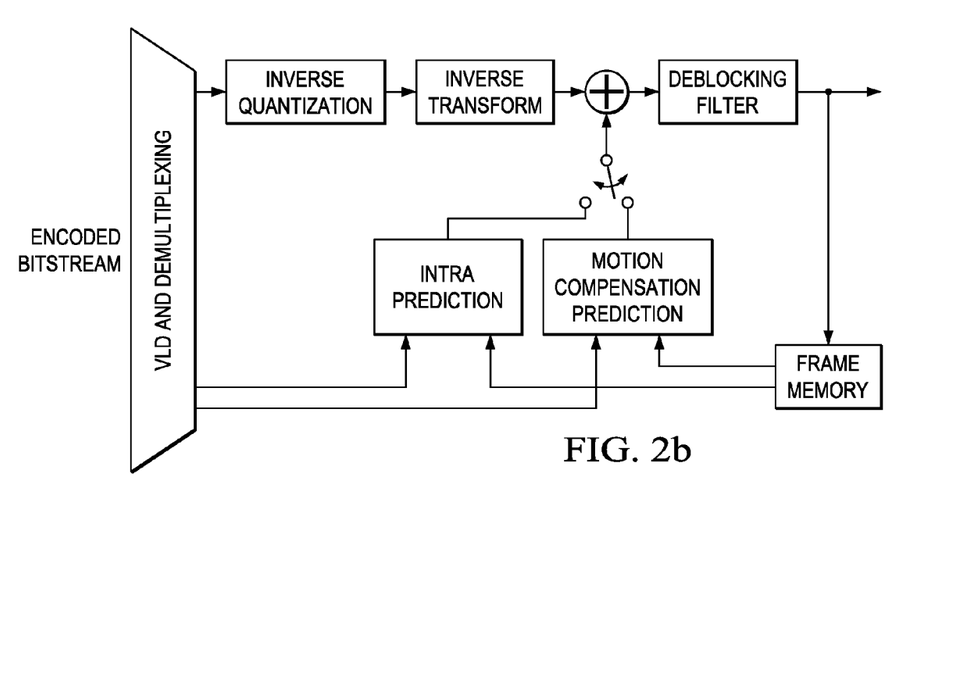
Figure 2C:
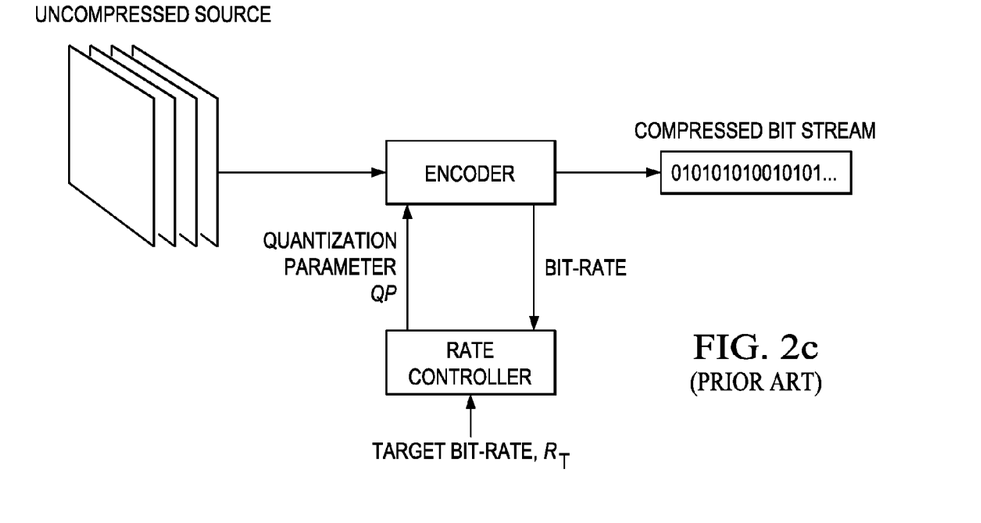

H.264/AVC is a recent video coding standard that makes use of several advanced video coding tools to provide better compression performance than existing video coding standards. At the core of all of these standards is the hybrid video coding technique of block motion compensation (prediction) plus transform coding of prediction error. Block motion compensation is used to remove temporal redundancy between successive pictures (frames or fields) by prediction from prior pictures, whereas transform coding is used to remove spatial redundancy within each block of both temporal and spatial prediction errors. FIGS. 2a-2b illustrate H.264/AVC functions which include a deblocking filter within the motion compensation loop to limit artifacts created at block edges.

Traditional block motion compensation schemes basically assume that between successive pictures an object in a scene undergoes a displacement in the x- and y-directions and these displacements define the components of a motion vector. Thus an object in one picture can be predicted from the object in a prior picture by using the object's motion vector. Block motion compensation simply partitions a picture into blocks and treats each block as an object and then finds its motion vector which locates the most-similar block in a prior picture (motion estimation). This simple assumption works out in a satisfactory fashion in most cases in practice, and thus block motion compensation has become the most widely used technique for temporal redundancy removal in video coding standards. Further, periodically pictures coded without motion compensation are inserted to avoid error propagation; blocks encoded without motion compensation are called intra-coded, and blocks encoded with motion compensation are called inter-coded.

Block motion compensation methods typically decompose a picture into macroblocks where each macroblock contains four 8×8 luminance (Y) blocks plus two 8×8 chrominance (Cb and Cr or U and V) blocks, although other block sizes, such as 4×4, are also used in H.264/AVC. The residual (prediction error) block can then be encoded (i.e., block transformation, transform coefficient quantization, entropy encoding). The transform of a block converts the pixel values of a block from the spatial domain into a frequency domain for quantization; this takes advantage of decorrelation and energy compaction of transforms such as the two-dimensional discrete cosine transform (DCT) or an integer transform approximating a DCT. For example, in MPEG and H.263, 8×8 blocks of DCT-coefficients are quantized, scanned into a one-dimensional sequence, and coded by using variable length coding (VLC). H.264/AVC uses an integer approximation to a 4×4 DCT for each of sixteen 4×4 Y blocks and eight 4×4 chrominance blocks per macroblock. Thus an inter-coded block is encoded as motion vector(s) plus quantized transformed residual block.

Similarly, intra-coded pictures may still have spatial prediction for blocks by extrapolation from already encoded portions of the picture. Typically, pictures are encoded in raster scan order of blocks, so pixels of blocks above and to the left of a current block can be used for prediction. Again, transformation of the prediction errors for a block can remove spatial correlations and enhance coding efficiency.

The rate-control unit in FIG. 2a is responsible for generating the quantization step (qp) by adapting to a target transmission bit-rate and the output buffer-fullness. Indeed, video streams are generally provided with a designated bit-rate for the compressed bit-stream. The bit-rate varies depending on the desired image quality, the capacity of storage/communication channel, etc. In order to generate compressed video streams of the specified bit-rate, a rate controller is implemented in practical video encoding systems. In the recent video coding standards, the bit-rate can be controlled through the quantization step size, which is used to quantize sample coefficients so that it may determine how much of spatial detail is retained. When the quantization step size is very small, the bit-rate is high and almost all of the picture detail is saved. As the quantization step size is increased, the bit-rate decreases at the cost of some loss of quality. The goal of the rate control is to achieve the target bit-rate by adjusting the quantization step size while minimizing the total loss of quality. A rate control algorithm may greatly affect the overall image quality even at a given bit-rate.

MPEG-2 Test Model 5 (TM5) rate control has achieved widespread familiarity as a constant bit rate (CBR), one-pass rate control algorithm. The one-pass rate control algorithms are suitable for real time encoding systems because the encoding process is performed only once for each picture. However, the quantization step size shall be determined prior to the encoding process. TM5 rate control algorithm determines the quantization step size in the following three steps: (1) bit allocation, (2) rate control, and (3) adaptive quantization. In short, step 1 assigns a budget of bits to the current picture based on the statistics obtained from previously encoded pictures. Then, to achieve the assigned budget, step 2 adjusts the quantization step size during the encoding process using a feedback loop. While the steps 1 and 2 are included to achieve higher compression efficiency, step 3 is included to improve subjective image quality.

However, the known rate control methods have problems with scene changes in the video sequence, and the quantization step may vary leading to unpleasant visual effects.

SUMMARY OF THE INVENTION

The present invention provides one-pass rate control methods with adaptive adjustment of bit allocation for the current picture to deal with scene changes by adaptation using the deviation of a quantization parameter from an average quantization parameter for prior pictures of the same type.

DESCRIPTION OF THE PREFERRED EMBODIMENTS

1. Overview

Figure 1A:
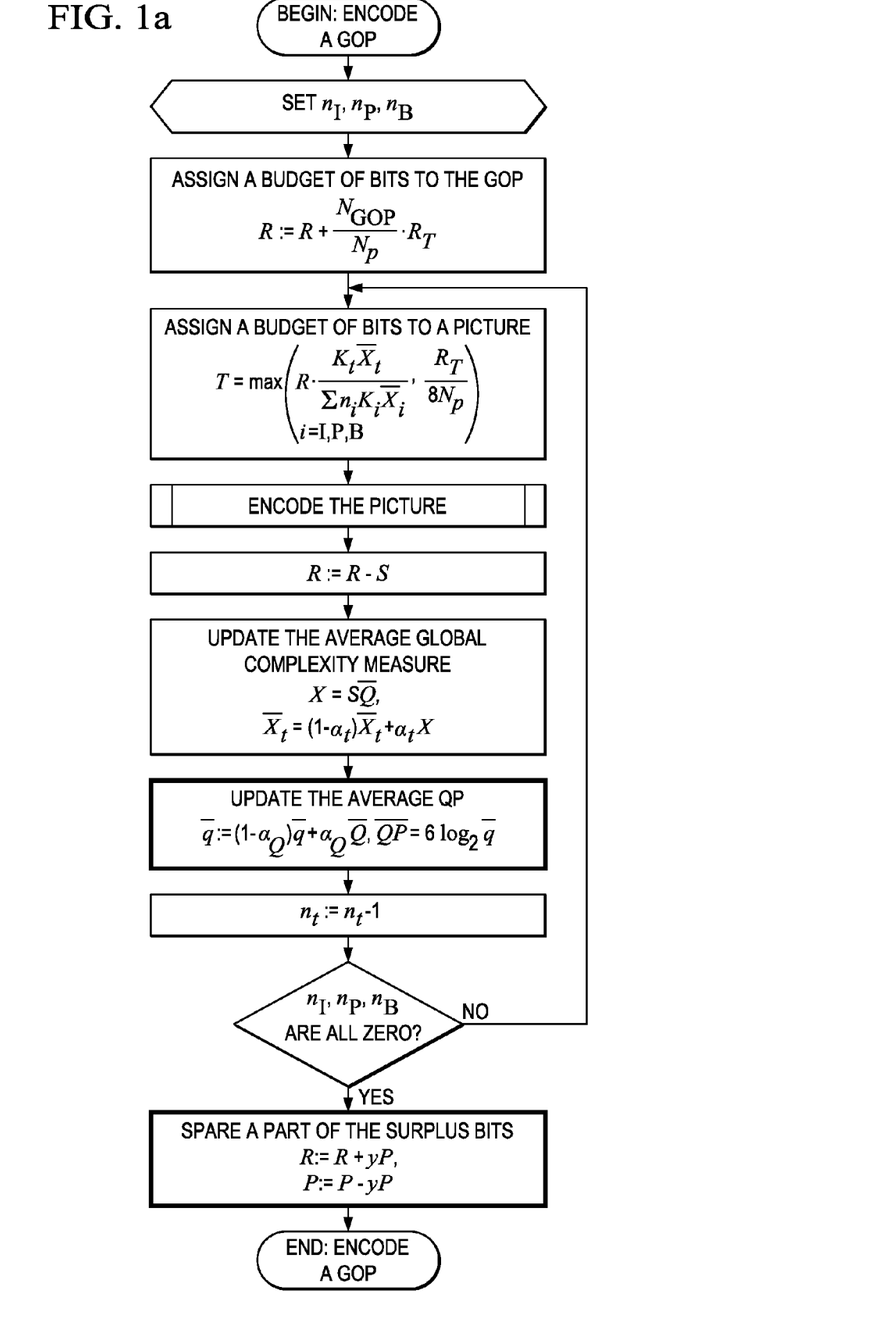
FIGS. 1a-1c are flowcharts.
Figure 1B:
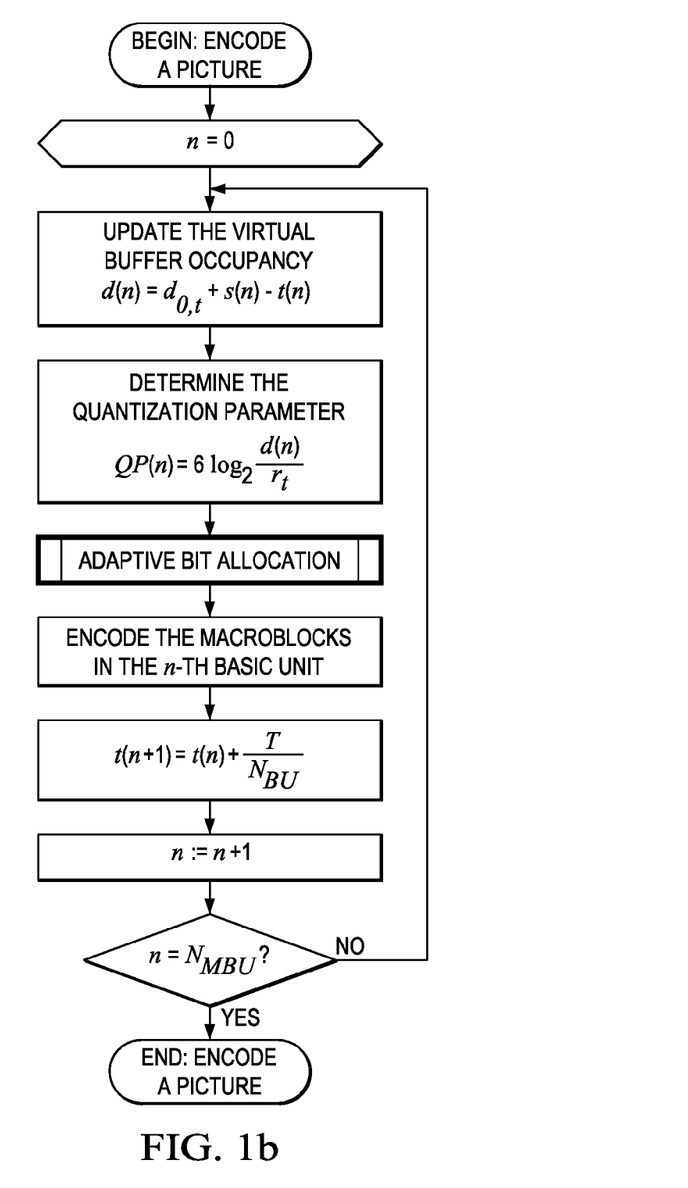
Figure 1C:
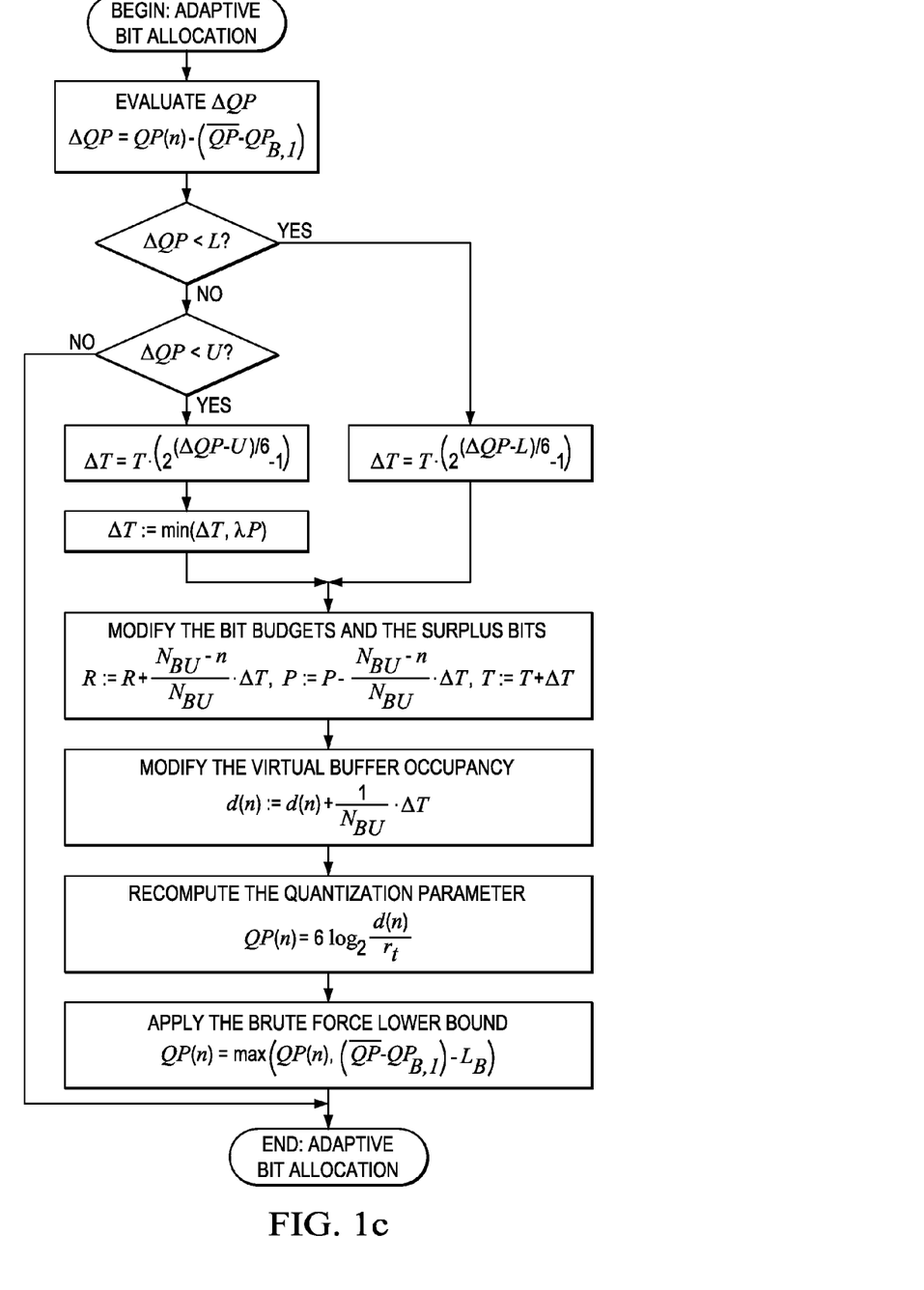

Preferred embodiment one-pass rate control methods with adaptive bit allocations use quantization parameter adpatation based on deviation from an average quantization parameter for pictures of the same type; see FIGS. 1a-1c. Bit-usage is saved from simpler pictures and increased for more complex pictures to reduce the variation of quantization step. Either constant bit-rate (CBR) or variable bit-rate (VBR) modes can be supported by a change of rate control parameters, even without an external scene-change detector.

Figure 3A:
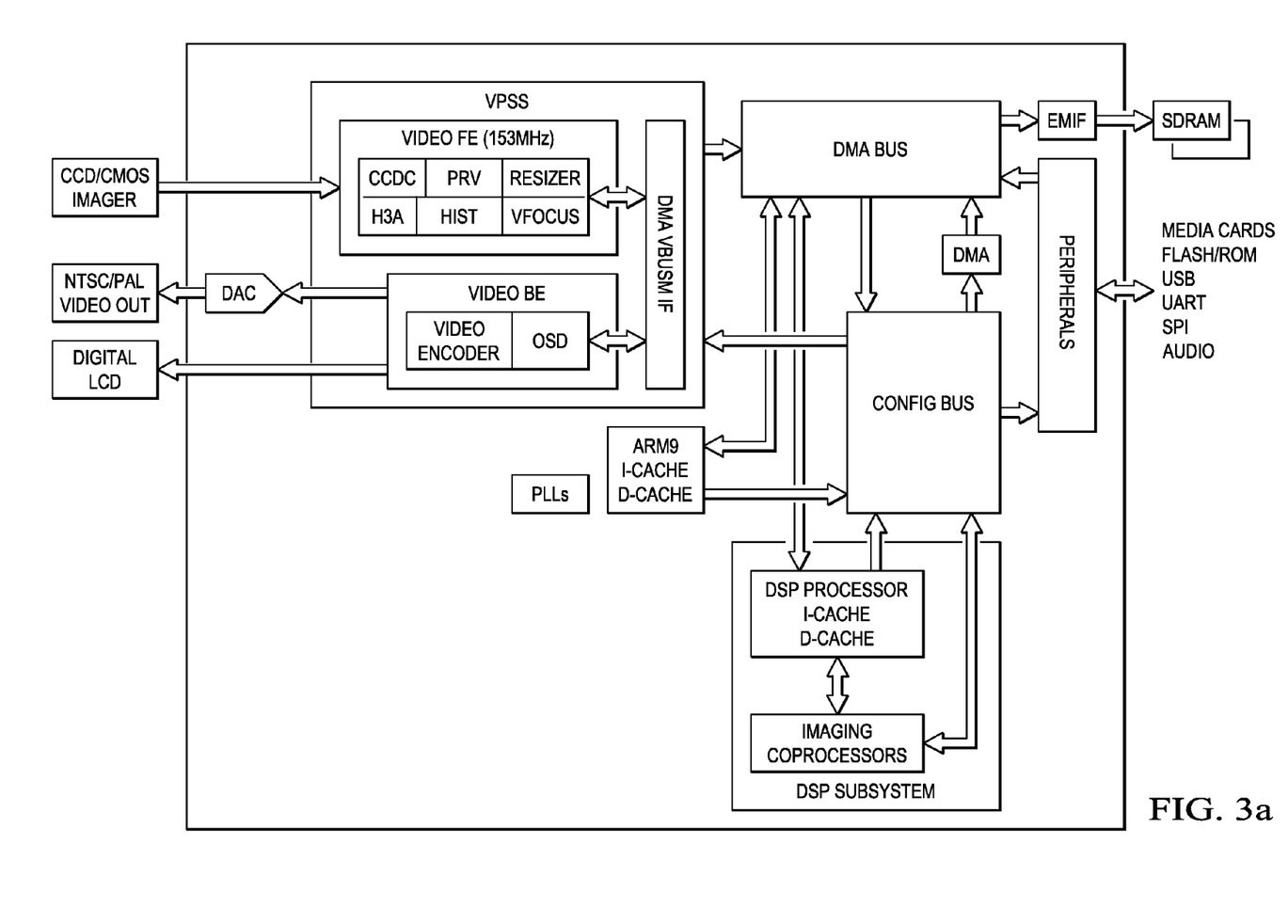
FIGS. 3a-3b illustrate a processor and network communication.
Figure 3B:
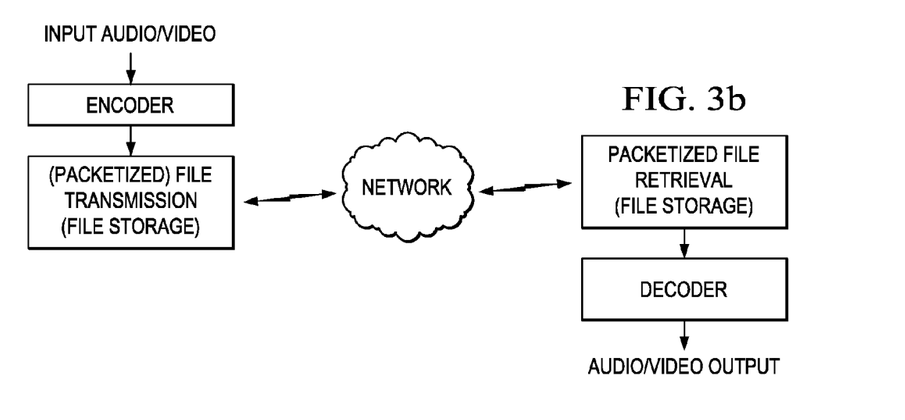

Preferred embodiment systems (e.g., camera cellphones, PDAs, digital cameras, notebook computers, etc.) perform preferred embodiment methods with any of several types of hardware, such as digital signal processors (DSPs), general purpose programmable processors, application specific circuits, or systems on a chip (SoC) such as multicore processor arrays or combinations such as a DSP and a RISC processor together with various specialized programmable accelerators (e.g., FIG. 3a). A stored program in an onboard or external (flash EEP) ROM or FRAM could implement the signal processing methods. Analog-to-digital and digital-to-analog converters can provide coupling to the analog world; modulators and demodulators (plus antennas for air interfaces such as for video on cellphones) can provide coupling for transmission waveforms; and packetizers can provide formats for transmission over networks such as the Internet as illustrated in FIG. 3b.

2. TM5 Rate Control

In order to explain preferred embodiment rate control methods, first consider TM5 rate control in more detail. In step 1 of the TM5 rate control, the so-called "global complexity measure" is employed to compute picture complexity and estimate the number of bits to be used for each picture. To begin with, some video sequences (of size QCIF, CIF and SD) are encoded with a H.264/AVC encoder for illustrative purpose. In the H.264/AVC standard, the quantization step size is exponentially related to the quantization parameter (QP) as $$Q = Q_0 2^{QP/6} \quad (1)$$

Figure 4:
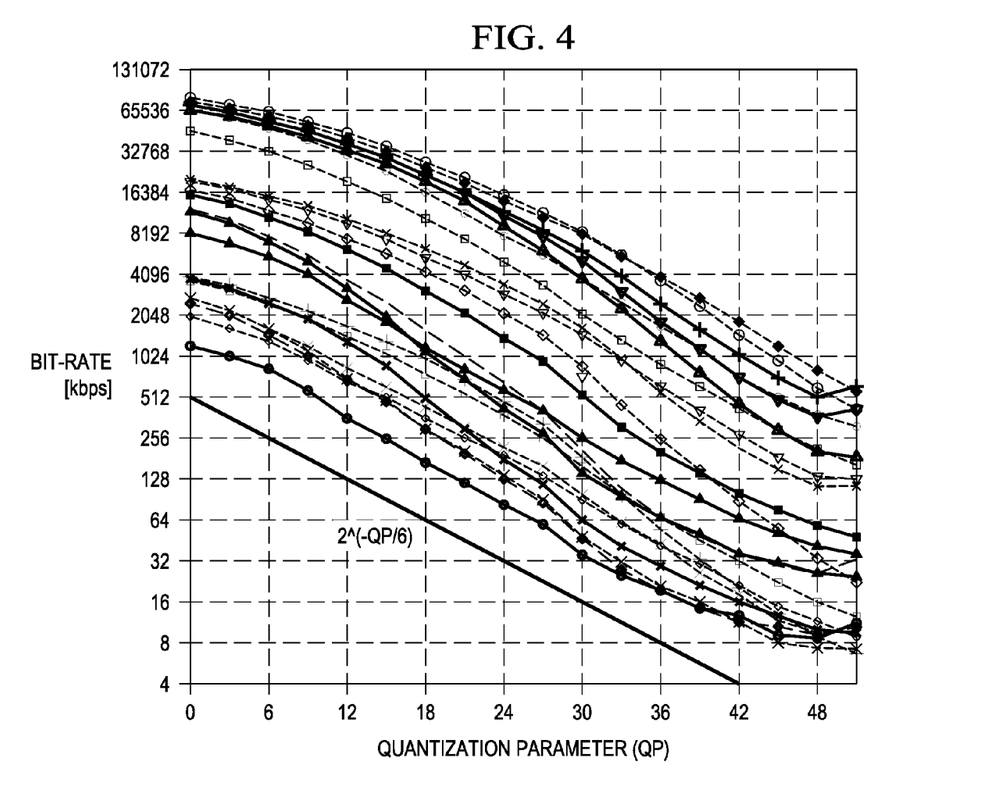
FIGS. 4-6 show bit rates, feedback control, and bit allocation.
Figure 5:
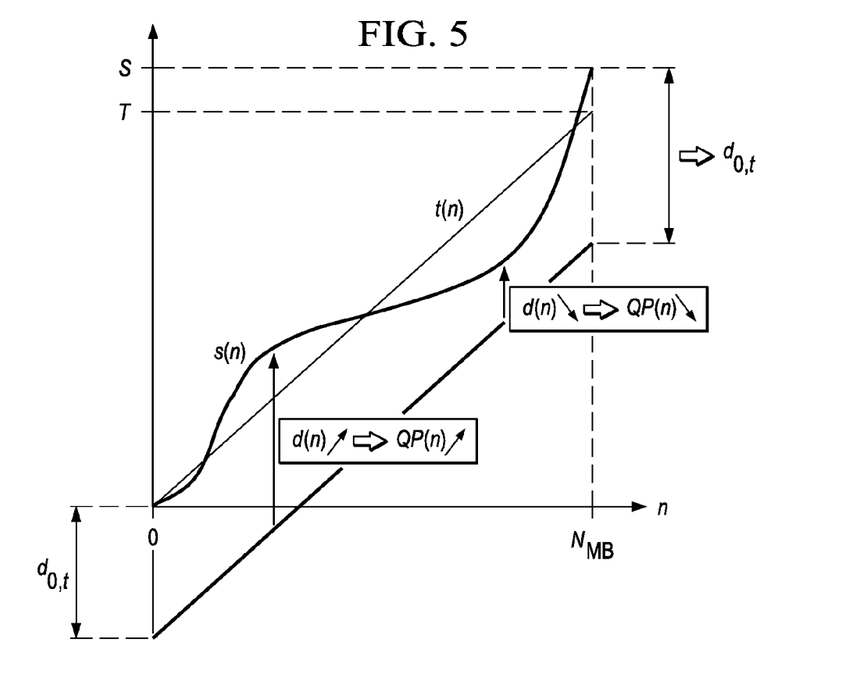

FIG. 4 shows the bit-rate when these video sequences are encoded with constant QPs. As can be seen from the figure, the bit-rate is roughly inversely proportional to the quantization step size. Hence, the following relation holds approximately:

$$R = X/Q \quad (2)$$

where R is the bit-rate, and X is the coefficient that represents the complexity of a video sequence. This simple relation gives the first order model between the bit-rate and the quantization step size. The picture complexity is measured by using the relation on a picture basis. First, the global complexity measure is defined as $$X = SQ_{ave} \quad (3)$$

where S is the number of bits generated by encoding a picture, and $Q_{ave}$ is the average of the quantization step size used during the encoding of the picture. By computing the global complexity measure for previously encoded pictures, the TM5 rate control evaluates the bit-rate for the current picture before performing the actual encoding process.

The complexity of pictures differs from sequence to sequence. It further depends on picture type. H.264/AVC, as well as previous video coding standards, defines three picture types: I-pictures, P-pictures, and B-pictures. In an I-picture, all of the macroblocks are compressed using the spatial redundancy (i.e., intra-prediction) between neighboring macroblocks within the picture itself. Meanwhile, in a P-/B-picture, some or most of the macroblocks are compressed using the temporal redundancy (i.e., inter-prediction) between successive pictures. Those macroblocks are predicted with reference to temporally near pictures, and only the prediction information (motion vectors) and the residual (prediction error) are encoded. The complexity of P-/B-pictures is therefore expected to be smaller than that of I-pictures. More precisely, a macroblock in a P-picture may refer to past I/P-pictures only, while that in B-pictures may refer to I/P-pictures in both past and future. Hence, the complexity of P-pictures tends to be smaller than that of I-pictures, and likewise, the complexity of B-pictures tends to be smaller than that of P-pictures. The picture complexity is therefore computed for each picture type separately.

At the same time, the reference structure of pictures suggests that the compression efficiency can be increased by raising the quality of the reference pictures. Indeed, suppose that a macroblock in a P-picture references to an area in an I-picture. Then, as the quality of the I-picture is increased, the prediction of the macroblock becomes more precise, so that the compression rate for the macroblock will be improved. That is, at the cost of an increased bit-rate for the I-picture, the bit-rate for the P-picture can be decreased. The same argument applies to B-pictures that refer to I/P-pictures. Hence, the quality will be improved by using lower QP (i.e., higher quality) for I-pictures and higher QP (i.e. lower quality) for B-pictures than for P-pictures even though the overall bit-rate is kept unchanged.

Because the TM5 rate control is designed for CBR mode, it may not handle scene changes effectively. At scene changes, the complexity of the current picture may be much different from that of the previous pictures. Since step 1 allocates the bit-rate based on the picture complexity of previous pictures, the assigned budget of bits for the current picture will then be inappropriate. As a result, step 2 will generate QPs deviating from those for the previous pictures. For example, if the complexity of the current picture is lower than that of the previous pictures, step 1 will assign a larger number of bits than required to attain the same image quality. Then, step 2 will give small quantization step size to consume the excessive budget of bits, and the image quality will be raised. On the other hand, if the complexity of the current picture is higher than the previous pictures, step 1 will assign a smaller number of bits than required. Then, step 2 will give larger quantization step size to secure the insufficient budget, and the image quality will be lowered. As a consequence of the quality variation, the visual smoothness between pictures will be lost. It is more problematic when the bit budget is less than required because a sudden appearance of degraded pictures tends to leave a bad impression on human eyes.

The best way to keep the visual smoothness is to use a fixed QP throughout the encoding process of a video sequence. This cannot be achieved, however, with one-pass rate control algorithms because the resultant bit-rate with a certain QP is not known beforehand. A common solution to deal with scene changes is to implement an external scene change detector and to adjust the bit budget when a scene change is detected. However, detection of scene changes requires extra computations, and moreover, it is generally difficult to define a scene change and determine the suitable bit budget.

3. Rate Control

While QP is computed for each macroblock in the TM5 rate control, it is computed for each basic unit in the preferred embodiment rate control where a basic unit is a run of consecutive macroblocks of a certain length in encoding order. Typically, the run has length equal to the picture width divided by the macroblock width (i.e., the basic unit is a slice of macroblocks across the picture). Next, define $N_{BU}$ to be the number of basic units in a picture:

$$N_{BU}=N_{MB}/N_{MBU}$$

where $N_{MB}$ and $N_{MBU}$ are the number of macroblocks in a picture and in a basic unit, respectively.

Let $R_T$ [bits/s] denote the target bit-rate. Then the preferred embodiment rate control comprises the following two steps (Bit Allocation and Rate Control).

Step 1: Bit Allocation

This step assigns a budget of bits to each group of pictures (GOP), and then to individual pictures within the GOP hierarchically; see FIG. 1a. A GOP begins with an I-picture and includes all of the following pictures in encoding order until the next I-picture. The bit allocation proceeds with a variable, R [bits], which denotes the number of remaining bits assigned to the GOP. The R is set to zero prior to the encoding process of a video sequence. Before encoding a GOP, the bit budget for the GOP is assigned (updated) as $$R=R+R_T N_{GOP}/N_P$$

where $N_{GOP}$ [pics] is the number of pictures in the GOP, and $N_P$ [pics/s] is the picture rate.

Then, before encoding a picture, R is allocated to the picture in proportion to both the averaged global complexity measure and the number of remaining pictures. The global complexity measure is computed as $X=SQ_{ave}$ with $Q_{ave}$ the average calculated by $$Q_{ave}=(1/N_{BU})\Sigma_{0 \leq n < N_{BU}} 2^{QP(n)/6} \qquad (4)$$

where QP(n) is the quantization parameter for the n-th basic unit. The global complexity measure is averaged in an IIR (infinite impulse response) manner for each picture type (I, P, B). That is, after the encoding of a picture of the respective picture type, update the average as:

$$X_{t,ave}=(1-\alpha_t)X_{t,ave}+\alpha_t X$$

where t is the current picture type, and $\alpha_t$ is the picture-type-dependent constant that determines the averaging period. Then, the remaining bits R are allocated to the current picture by $$T=\max\{RK_t X_{t,ave}/\Sigma_{i=I,P,B} n_i K_i X_{i,ave}, R_T/8N_P\}$$

where T [bits] is the bit budget for the current picture, $n_I$, $n_P$, and $n_B$ are the numbers of the remaining pictures to be encoded in the GOP, and $K_I$, $K_P$, and $K_B$ are the weighting factors to allocate more bits to I-pictures and less to B-pictures in order to attain higher compression efficiency. As shown in the above equation, if the derived budget is too small due to a temporal lack of the remaining bits, the budget will be increased to a certain number of bits ($R_T/8N_P$) to avoid a picture of the lowest image quality. After encoding the picture, the actual number of bits generated, S, is subtracted from the number of remaining bits, R, as $$R=R-S$$

Step 2: Rate Control

According to the bit budget for the current picture, T, the QP is determined for each basic unit in the current picture using the virtual buffer model; see FIG. 1b. The virtual buffer is prepared for each picture type, and before encoding the n-th basic unit (n=0, 1, 2, . . . , $N_{BU}$−1), the buffer occupancy d(n) is updated by:

$$d(n)=d_{0,t}+s(n)-t(n) \qquad (5)$$

where $d_{0,t}$ is the initial buffer occupancy of the picture type t, s(n) is the number of bits generated by encoding all of the basic units in the current picture prior to basic unit n (i.e., basic units 0, 1, 2, . . . , n−1), and t(n) is the number of bits assigned for those basic units. Note that the following relations hold:

$$s(0)=0,\ s(N_{BU})=S,\ t(0)=0$$

Then, the QP for the encoding of the n-th basic unit is determined by $$QP(n)=6\log_2[d(n)/r_t] \qquad (6)$$

where $r_t$ is the reaction parameter that adjusts the feedback response for the current picture type t. The parameter $r_t$ is defined by $$r_t=\beta_t R_T/N_P \qquad (7)$$

where $\beta_t$ is a constant factor to equalize the feedback response among the picture types. This feedback works as follows (see FIG. 1c). When an excessive number of bits are used with respect to the budget T, the buffer occupancy d(n) increases as in (5). Then, the quantization step size Q(n) is set larger from (6), and the bit usage will be pulled down. Meanwhile, when an excessive number of bits are saved, the buffer occupancy d(n) decreases. Then, Q(n) is set smaller and the bit usage will be pulled up. Thus, the bit usage is controlled so that the budget T will be achieved.

Figure 6:
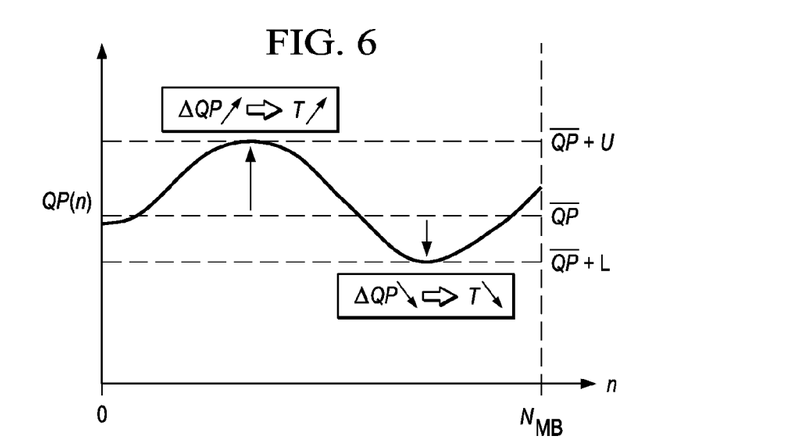

After QP is determined by the feedback, examine whether it deviates from the average QP of the recently encoded pictures. If QP is smaller than the average QP (i.e., higher quality) by a predefined amount, the bit budget T will be decreased (see FIG. 6). Meanwhile, if QP is larger than the average QP (i.e., lower quality) by the predefined amount, the bit budget T will be increased provided that there are available surplus bits. Then, QP(n) will be recomputed with the revised T. It is expected that with this adaptive bit allocation technique, QP(n) will get closer to the average QP. A more detailed description of the adaptive bit allocation is in Section 4.

After the encoding of the n-th basic unit, the number of bits assigned for the basic unit is accumulated as $$t(n+1)=t(n)+T/N_{BU}$$

When the adaptive bit allocation is disabled, the bit budget T will not be changed and t(n) is simply given by $$t(n)=nT/N_{BU}$$

After all of the basic units in the current picture are encoded, update the initial buffer occupancy for the next picture of the same picture type:

$$d_{0,t}=d(N_{BU})=d_{0,t}+S-t(N_{BU})$$

4. Quantization Parameter Deviation from Average

In order to deal with scene changes, the preferred embodiment method watches for changes in the QP determined for each basic unit in Step 2. If the picture complexity changed at a scene change, then the bit budget T will be inappropriate and thereby the QP will deviate from those for the previous pictures. Hence, the change of picture complexity can be detected as the deviation of QP. If the deviation exceeds a predefined threshold, then the preferred embodiment method adjusts the bit budget T and recomputes the QP so that the deviation may be reduced. As the reference QP for measurement of the deviation, the average QP is defined as follows. First, the average quantization step size is computed in an IIR manner after the encoding of each picture as $$q_{ave}=(1-\alpha_Q)q_{ave}+\alpha_Q Q_{ave}$$

where $Q_{ave}$ is defined by (4), and $\alpha_Q$ is a constant that determines the averaging period. Then, the average QP is defined by $$QP_{ave}=6\log_2[q_{ave}]$$

The deviation of the QP determined for the current basic unit n is defined by $$\Delta QP=QP(n)-(QP_{ave}-QP_{B,t})$$

where $QP_{B,t}$ is the picture type dependent bias for the average QP to assign smaller QP (i.e., higher quality) for I-pictures and larger QP (i.e., lower quality) for B-pictures. The biasing of the average QP is in accordance with the weight $K_t$, which was used in the assignment of T in Step 1 to assign more bits to I-pictures and fewer to B-pictures.

Then, if $\Delta QP$ is less than a predefined lower threshold L, the bit budget T will be increased by $$\Delta T=T(2^{(\Delta QP-L)/6}-1) \text{ if } \Delta QP<L$$

In this case, T will actually be decreased because $\Delta T$ is negative. With this $\Delta T$, and T will be decreased to $T \cdot 2^{(\Delta QP-L)/6}$, which is intended to diminish the excess amount of the deviation, $L-\Delta QP$, according to (1) and (2). As the picture bit budget T is decreased, the bit budget for the GOP is also decreased as $$R=R+\Delta T(N_{BU}-n)/N_{BU} \quad (8)$$

Note that the number of bits reduced by the adjustment depends on n as suggested by the above substitution, which excludes the already encoded basic units prior to n. Meanwhile, the saved bits are added to the surplus bits, P [bits], for future use as $$P=P-\Delta T(N_{BU}-n)/N_{BU} \quad (9)$$

The P is set to zero prior to the encoding process of a video sequence.

On the other hand, if $\Delta QP$ is greater than predefined upper threshold U, the bit budget T will be increased by $$\Delta T=T(2^{(\Delta QP-U)/6}-1) \text{ if } \Delta QP>U$$

Namely, T will be increased to $T \cdot 2^{(\Delta QP-U)/6}$, which is intended to diminish the excess amount of deviation, $\Delta QP-U$, according to (1) and (2). The amount of the increment is actually limited to a part of the surplus bits as follows:

$$\Delta T=\min\{\Delta T,\lambda P\}$$

where $\lambda(0<\lambda\leq 1)$ is a constant parameter that determines how many of the surplus bits are consumed at a time. Then, as the picture bit budget T is increased, the bit budget for the GOP is increased by (8) and the surplus bits are decreased by (9).

If the bit budget T is changed in the above, the virtual buffer occupancy d(n) will accordingly be modified as $$d(n)=d(n)+\Delta T/N_{BU}$$

and QP(n) will be recomputed by (6). If the updated QP(n) is still much smaller than $QP_{ave}$, then it will be further lower bounded by $$QP(n)=\max\{QP(n),(QP_{ave}-QP_{B,t})+L_B\}$$

where $L_B$ is the brute force lower bound of QP. This is to avoid an exceptionally small value of QP(n) that is likely to be caused by an overshoot of the feedback loop while encoding easier image contents. The value of $L_B$ must be less than L. Otherwise, the QP feedback loop may become unstable.

After the encoding of the GOP, a part of the surplus bits are spared for R for the encoding of the next GOP as $$R=R+\gamma P$$

$$P=P-\gamma P$$

where $\gamma(0<\gamma\leq 1)$ is a constant parameter that determines how many of the surplus bits are spared for the next GOP. It is set to one for CBR mode. To enable VBR mode, it is set to less than one.

The rate control parameters used in the preferred embodiment methods are listed in the following table together with their optimized values. By changing some of the parameter values, the preferred embodiment method works in VBR mode as well as in CBR mode.

|  |  | Values | |
| --- | --- | --- | --- |
| Parameter | Description | CBR | VBR |
| $(K_I, K_P, K_B)$ | picture type dependent weights on the global complexity measures | (2, 1.5, 1) | |
| $(\alpha_I, \alpha_P, \alpha_B)$ | averaging factors for the global complexity measures | (½, ⅛, 1/16) | |
| $(\beta_I, \beta_P, \beta_B)$ | picture type dependent factors for the reaction parameter | (4, 2, 1) | |
| $(QP_{B,I}, QP_{B,P}, QP_{B,B})$ | picture type dependent bias for $\Delta QP$ | (3, 2, 0) | (2, 1, 0) |
| $\alpha_Q$ | averaging factor for the quantization parameter | 1/16 | 1/32 |
| $\gamma$ | allocation ratio of P to R | 1 | ¼ |
| $\lambda$ | allocation ratio of P to T when $\Delta QP > U$ | 1 | ¼ |
| (L, U) | lower and upper thresholds for $\Delta QP$ | (−9, 2) | (0, 4) |
| $L_B$ | brute force lower bound of $\Delta QP$ | −12 | −2 |

The averaged global complexity measures are initialized as $$X_{I,ave}=90000 N_{MB}$$

$$X_{P,ave}=45000 N_{MB}$$

$$X_{B,ave}=30000 N_{MB}$$

Other variables are initialized using the initial QP value, $QP_{INIT}$, which is derived from the number of bits per pixel:

$$QP_{INIT}=13.7-\log_2[bpp]$$

$$bpp=R_T/N_P N_{MB} 256$$

where the constant 13.7 was experimentally obtained. Then, the average quantization step size and the average quantization parameter are initialized as $$q_{ave}=2^{QP_{INIT}/6}$$

$$QP_{ave}=QP_{INIT}$$

The initial virtual buffer occupancy, $d_{0,t}$, is determined to reproduce $QP_{INIT}$ in the very first basic unit as follows $$d_{0,t}=r_t 2^{QP_{INIT}/6}$$

5. Experimental Results

The preferred embodiment rate control with adaptive bit allocation was experimentally evaluated. Table 3 presents the rate control results for movie trailers of "Men in Black" and "Spider-Man", in addition to the concatenation of the first 40 frames of well-used video sequences of size SD, CIF, and QCIF, with encoding options listed in Table 2. In Table 3, the case (A) without the adaptive bit allocation is compared to the constant bit-rate (CBR) case (B) and the variable bit-rate (VBR) case (C), in terms of actual bit-rate, sequence SNR, and the worst picture-SNR. The worst picture-SNR may be used as a measure of the degree of adaptation for the scene changes. If a rate control method is better capable of dealing with scene changes, the worst picture-SNR will be retained higher while the sequence SNR is not sacrificed.

For the CBR case, the target bit-rate is successfully achieved within the deviation of −2.0%~+0.1%. Meanwhile, the sequence SNR is improved by 0.34 dB and the worst picture-SNR by 0.51 dB, on average. For the VBR case, although the actual bit-rate is considerably lower than the target bit-rate in some cases, the SNR improvements are as significant as 0.75 dB for the sequence SNR, and 2.23 dB for the worst picture-SNR, on average. It can be concluded that the preferred embodiment rate control with adaptive bit allocation can handle scene changes more effectively even under CBR environment. Further, this adaptive bit allocation technique can realize VBR mode even without an external scene change detector.

6. Modifications

The preferred embodiment rate control methods may be modified in various ways while retaining one or more of the features of using (i) quantization parameter deviation from an average, (ii) quantization parameters for basic units rathe than individual macroblocks, (iii) averaged global complexity measures, and (iv) reaction parameters dependent upon picture type.

For example, the various initial variable values and parameter values could be varied; pictures could be either frames or fields; and so forth.

What is claimed is:

1. A method of one-pass rate control for video encoding, comprising the steps of:
    (a) assigning a budget of bits for a group of pictures (GOP);
    (b) assigning a budget of bits for a picture within the GOP in proportion to both an average global complexity measure and the number of remaining pictures for each picture type;
    (c) computing a quantization parameter (QP) for a set of N successive macroblocks in the picture where N is an integer greater than 1;
    (d) when the deviation of the QP from an average over prior sets of N macroblocks of a QP exceeds a threshold, adjusting the budget of bits for a picture so the excess of the deviation will be diminished, and recompute the QP;
    (e) limiting the deviation of the revised QP with the brute force lower bound
    (f) repeating steps (c)-(e) until all the sets of N macroblocks in the picture are encoded;
    (g) updating the average global complexity measure and the average QP;
    (h) repeating steps (b)-(g) until all the pictures in the GOP are encoded;
    (i) repeating steps (a)-(h) until all the GOPs in the video sequence are encoded.

2. The method of claim 1, wherein the change of picture complexity is detected by the QP deviation, whereby an external scene change detector is not required.

TABLE 2

| option | parameter |
|---|---|
| picture type | frame for progressive, field for interlaced sequences |
| intra frame period | 30 frames |
| number of B-pitures | 2 (IBBPBBP . . . ) |
| entropy coding | CABAC |
| direct mode | spatial direct |
| number of reference frames | 1 |
| motion search range | 16 × 16 pixels |
| deblocking filter | used |
| compression rate | 1/30, 1/60, 1/120 |
| $N_{MBU}$ | picture width in macroblocks (i.e. picture width/16) |
| bit depth | 8 bits/pixel |
| chrominance format | 4:2:0 |

TABLE 3

| Sequence | Target bit-rate [kbps] | (A) w/o Adaptive Bit Allocation | | | (B) CBR mode | | | (C) VBR mode | | | (B) − (A) | | (C) − (A) | |
|---|---|---|---|---|---|---|---|---|---|---|---|---|---|---|
| | | bit-rate [kbps] | SNR [dB] | worst [dB] | bit-rate [kbps] | SNR [dB] | worst [dB] | bit-rate [kbps] | SNR [dB] | worst [dB] | SNR [dB] | worst [dB] | SNR [dB] | worst [dB] |
| men in black | 372 | 370.58 | 33.51 | 22.11 | 369.22 | 33.96 | 21.96 | 360.10 | 34.66 | 22.12 | 0.45 | −0.15 | 1.15 | 0.01 |
| | 745 | 742.70 | 36.37 | 23.11 | 736.58 | 36.65 | 23.19 | 678.31 | 37.32 | 23.26 | 0.29 | 0.08 | 0.96 | 0.16 |
| | 1490 | 1484.49 | 39.56 | 24.86 | 1462.46 | 39.91 | 24.93 | 983.61 | 39.41 | 25.05 | 0.35 | 0.07 | −0.15 | 0.18 |
| spiderman | 372 | 367.81 | 31.10 | 20.52 | 367.13 | 31.91 | 21.65 | 352.14 | 32.94 | 22.69 | 0.80 | 1.14 | 1.84 | 2.17 |
| | 745 | 736.56 | 34.01 | 22.36 | 730.94 | 35.00 | 23.21 | 700.47 | 36.36 | 26.82 | 0.99 | 0.85 | 2.35 | 4.46 |
| | 1490 | 1472.12 | 36.91 | 22.66 | 1463.73 | 38.31 | 25.96 | 1275.19 | 39.69 | 32.36 | 1.40 | 3.30 | 2.77 | 9.70 |
| concatination | 1024 | 1023.60 | 23.84 | 20.14 | 1023.57 | 23.82 | 20.28 | 878.98 | 23.49 | 20.43 | −0.02 | 0.14 | −0.35 | 0.29 |
| of SD | 2048 | 2047.36 | 26.51 | 22.42 | 2047.52 | 26.52 | 22.42 | 1811.53 | 26.33 | 23.57 | 0.00 | 0.00 | −0.18 | 1.14 |
| sequences | 4096 | 4095.72 | 29.70 | 25.02 | 4096.00 | 29.70 | 25.02 | 3727.80 | 29.62 | 26.13 | 0.01 | 0.00 | −0.07 | 1.11 |
| concatination | 256 | 256.86 | 27.93 | 21.34 | 256.21 | 28.38 | 22.68 | 210.01 | 28.79 | 24.61 | 0.45 | 1.33 | 0.86 | 3.27 |
| of CIF | 512 | 512.16 | 31.25 | 24.97 | 512.23 | 31.37 | 25.35 | 462.01 | 32.08 | 27.02 | 0.12 | 0.37 | 0.83 | 2.04 |
| sequences | 1024 | 1024.06 | 34.46 | 28.79 | 1023.99 | 34.48 | 28.71 | 939.44 | 35.43 | 30.12 | 0.02 | −0.08 | 0.97 | 1.33 |
| concatination | 64 | 63.96 | 31.57 | 26.70 | 63.91 | 31.50 | 26.66 | 52.06 | 31.54 | 28.62 | −0.07 | −0.03 | −0.04 | 1.92 |
| of QCIF | 128 | 127.97 | 34.97 | 29.03 | 127.92 | 34.95 | 29.10 | 104.55 | 35.16 | 31.24 | −0.02 | 0.07 | 0.19 | 2.22 |
| sequences | 256 | 255.94 | 38.16 | 30.40 | 255.73 | 38.50 | 30.91 | 192.67 | 38.29 | 33.84 | 0.34 | 0.51 | 0.13 | 3.44 |
| average | | | | | | | | | | | 0.34 | 0.51 | 0.75 | 2.23 |

3. The method of claim 1, wherein the QP is updated for each set of N successive macroblocks.

4. The method of claim 1, wherein the global complexity measure is averaged.

5. The method of claim 1, further comprising a reaction parameter, wherein the reaction parameter depends on the picture type.

6. A digital camera, comprising:
(i) a sensor; and
(ii) circuitry for video processing coupled to said sensor; said circuitry operable to encode a sequence of pictures with rate control including:
   (a) assigning a budget of bits for a group of pictures (GOP);
   (b) assigning a budget of bits for a picture within the GOP in proportion to both an average global complexity measure and the number of remaining pictures for each picture type;
   (c) computing a quantization parameter (QP) for a set of N successive macroblocks in the picture where N is an integer greater than 1;
   (d) when the deviation of the QP from an average over prior sets of N macroblocks of a QP exceeds a threshold, adjusting the budget of bits for a picture so the excess of the deviation will be diminished, and recompute the QP;
   (e) limiting the deviation of the revised QP with the brute force lower bound
   (f) repeating steps (c)-(e) until all the sets of N macroblocks in the picture are encoded;
   (g) updating the average global complexity measure and the average QP;
   (h) repeating steps (b)-(g) until all the pictures in the GOP are encoded;
   (i) repeating steps (a)-(h) until all the GOPs in the video sequence are encoded.

\* \* \* \* \*